United States Patent [19]

Shankman

[11] Patent Number: 4,858,256
[45] Date of Patent: Aug. 22, 1989

[54] CHEMICAL EQUIPMENT DECONTAMINATION TRUCK

[76] Inventor: Jay Shankman, 48 Castle La., Holtsville,, N.Y. 11742

[21] Appl. No.: 77,243

[22] Filed: Jul. 24, 1987

[51] Int. Cl.⁴ .............................................. A47K 3/22
[52] U.S. Cl. ......................................... 4/597; 4/663; 296/19; 296/24.1; 296/183
[58] Field of Search .................... D12/1, 3, 14, 96; 4/599, 597, 663, 662, 664, 612; 252/631, 632, 633; 600/21; 296/3, 14, 19, 24 R, 183

[56] References Cited

U.S. PATENT DOCUMENTS

| | | | |
|---|---|---|---|
| 1,269,667 | 6/1918 | Williams | 296/24 R |
| 2,620,220 | 12/1952 | Gresham | 296/24 R |
| 3,501,213 | 5/1967 | Trexler | 600/21 X |
| 3,594,825 | 7/1971 | Reid | 4/663 |
| 3,668,710 | 6/1972 | Dowd | 4/597 |
| 4,348,777 | 3/1981 | Peterson | 4/597 X |
| 4,359,789 | 11/1982 | Roberts | 4/663 X |
| 4,675,923 | 6/1987 | Ashley | 4/599 |

FOREIGN PATENT DOCUMENTS

| | | | |
|---|---|---|---|
| 2415906 | 10/1975 | Fed. Rep. of Germany | 4/612 |
| 3545488 | 7/1987 | Fed. Rep. of Germany | 296/24 R |
| 773352 | 11/1934 | France | 296/19 |

Primary Examiner—Henry J. Recla
Assistant Examiner—Daniel D. Stein-Freer

[57] ABSTRACT

A self-contained decontamination vehicle containing a system for man-carried equipment washing down personnel at the site of a major chemical disaster. The vehicle contains equipment for decontaminating the equipment used by the emergency personnel so that such man-carried equipment can be brought back into service immediately. All contaminated liquids are either retained within the vehicle for later disposition in a safe manner, or such liquids are decontaminated before being returned to the environment.

8 Claims, 4 Drawing Sheets

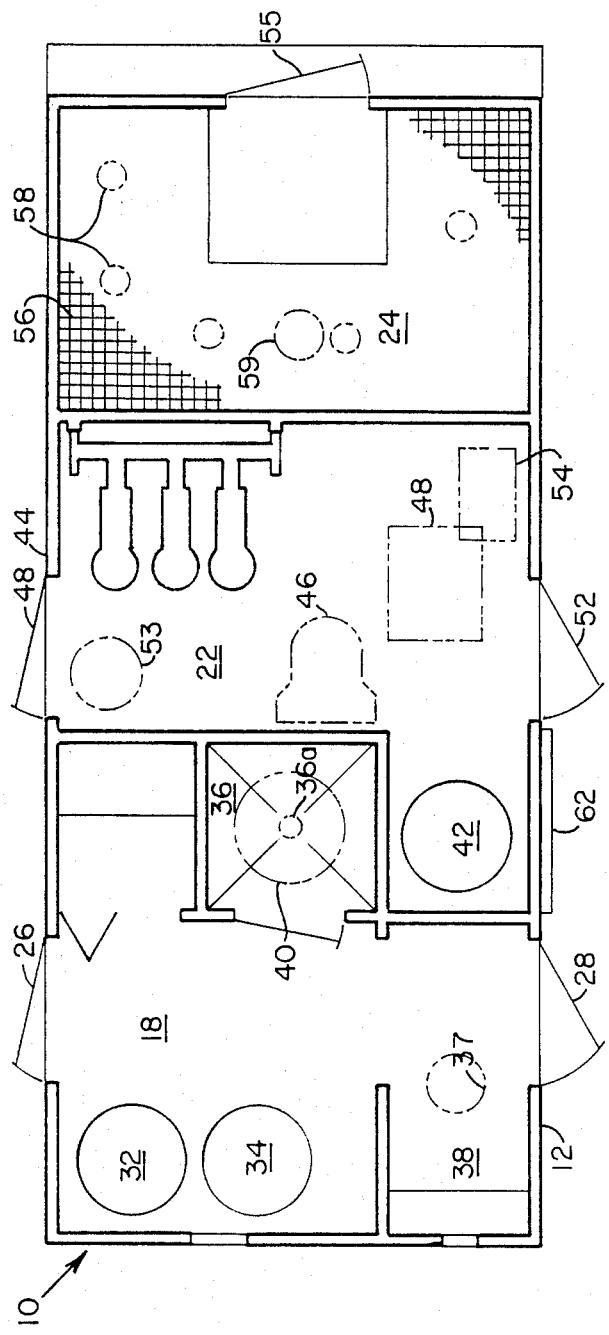
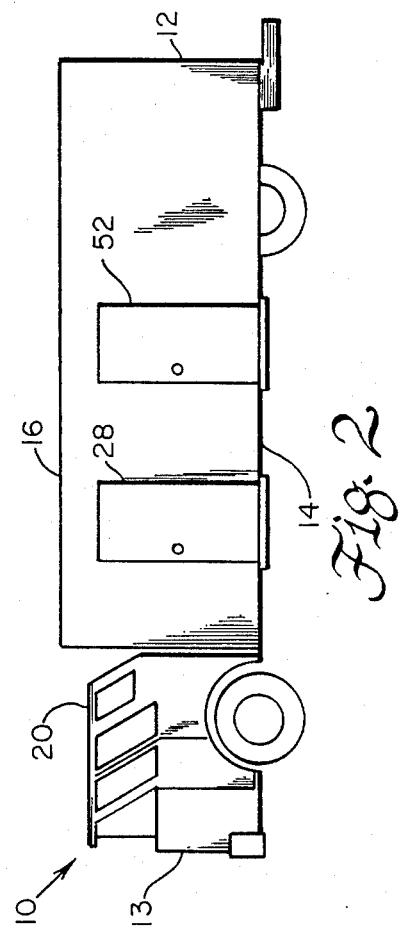

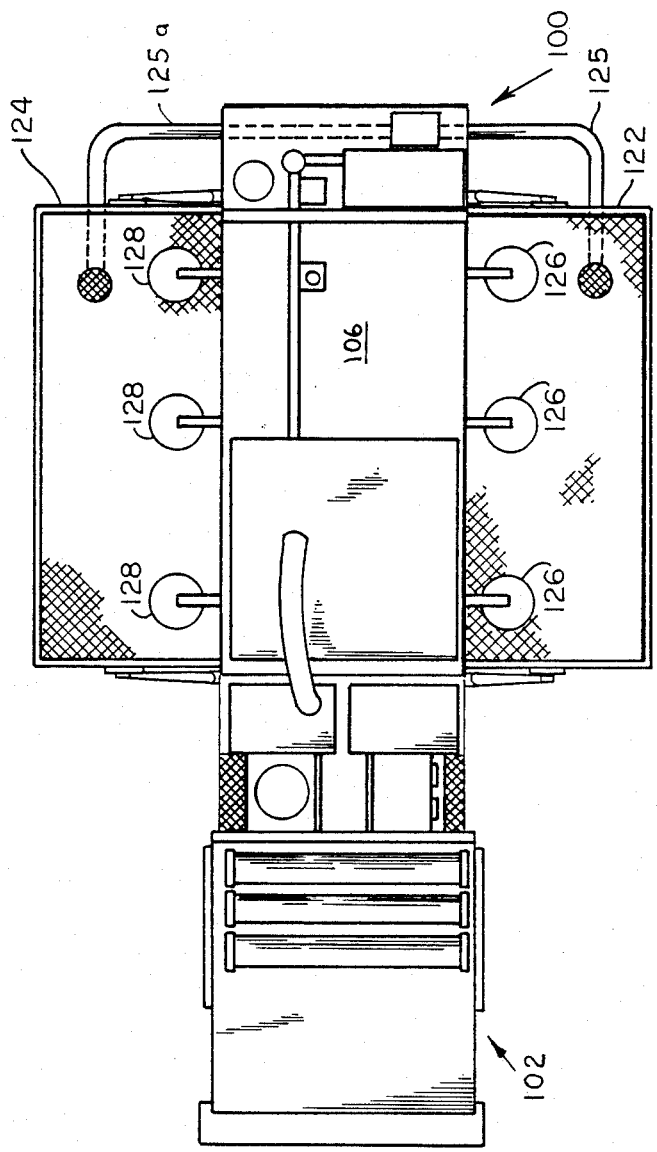

CHEMICAL EQUIPMENT DECONTAMINATION TRUCK

BACKGROUND OF THE INVENTION

The present invention relates to a mobile system for the chemical and radiation decontamination of equipment and more particularly to a system for decontaminating the man carried equipment of emergency services such as fire departments responding to a chemical or radiation disaster in which their equipment may become contaminated with toxic chemical substances as a result of efforts to fight the disaster and to rescue persons who have been injured or contaminated in the disaster.

As described in my patent application Ser. No. 037,208 filed on Apr. 10, 1987, entitled "Chemical and/or Radiation Decontamination", presently existing facilities for dealing with emergencies occurring as a result of accidents in chemical plants are inadequate to meet any major disaster. My earlier application deals with the problem of maintaining the integrity of hospital facilities receiving large numbers of contaminated persons injured in such accidents.

Another aspect of the problem in dealing with such disasters concerns the equipment carried by emergency rescue teams to deal with any consequential fire, explosions (real or potential), rescue of injured and endangered personnel, and the securing of toxic, inflammable, or explosive products and the like which may be exposed. During such rescue operations, the equipment carried by the rescue personnel may become contaminated with toxic substances with the resulting danger that the toxic substances may be spread to themselves or other persons caught up in the disaster.

Present efforts for dealing with this problem involve turning water hoses on the personnel and man-carried equipment, offering minimal effectiveness and also increasing the chance of spreading the contaminants through the run-off water.

SUMMARY OF THE INVENTION

This invention is a mobile system for use in the field while an emergency team is dealing with a disaster for removing contaminants from the man-carried equipment and washing down contaminated emergency personnel so that they can be transferred to a hospital for full decontamination and toxic screening.

In accordance with a preferred embodiment of this invention there is provided a self-contained decontamination vehicle comprising a first compartmentalized area for receiving contaminated clothes of personnel, for showering said personnel to remove surface contaminants, and for blow drying said personnel prior to leaving said vehicle. A second compartmentalized area is provided to house equipment such as that required for detergent ejection, water deluge and drying of the personnel in the first area. A third area is used for conducting the decontamination of equipment carried by the personnel including means for subjecting said equipment to detergent ejection, water deluge and drying, and means for filtering all waste chemically contaminated water utilized in the first and third compartment areas for removal of all detergents and contaminants and returning the cleansed waste water to a tank for re-use or removal of the water. Waste water contaminated by radiation is not filtered but discharges from the truck for disposal elsewhere.

All of the compartments in the vehicle and the equipment utilized in carrying out the various functions for vehicle are arranged in a compact and efficient manner so that the vehicle may have overall dimensions which permit it to be driven along any road where any of the other emergency vehicles are capable of traveling.

With this invention it is possible to re-use emergency equipment in dealing with the disaster without concern that further spread of the contamination is taking place.

It is thus a principal object of this invention to provide a mobile system for use in the field at the site of a chemical disaster by emergency personnel to decontaminate man-carried emergency equipment so that they can remain in service as long as the need for them continues.

Other objects and advantages of this invention will hereinafter become obvious from the following detailed description of the preferred embodiments of this invention.

BRIEF DESCRIPTION OF THE DRAWINGS

FIG. 1 is a partially schematic plan view in section of a truck or trailer body incorporating the principles of this invention.

FIG. 2 is an elevation side view of a truck carrying the body illustrated in FIG. 1.

FIG. 6 is a plan view of the embodiment of FIG. 6 with the water collectors extended.

DETAILED DESCRIPTION OF THE PREFERRED EMBODIMENTS

Figure 3:
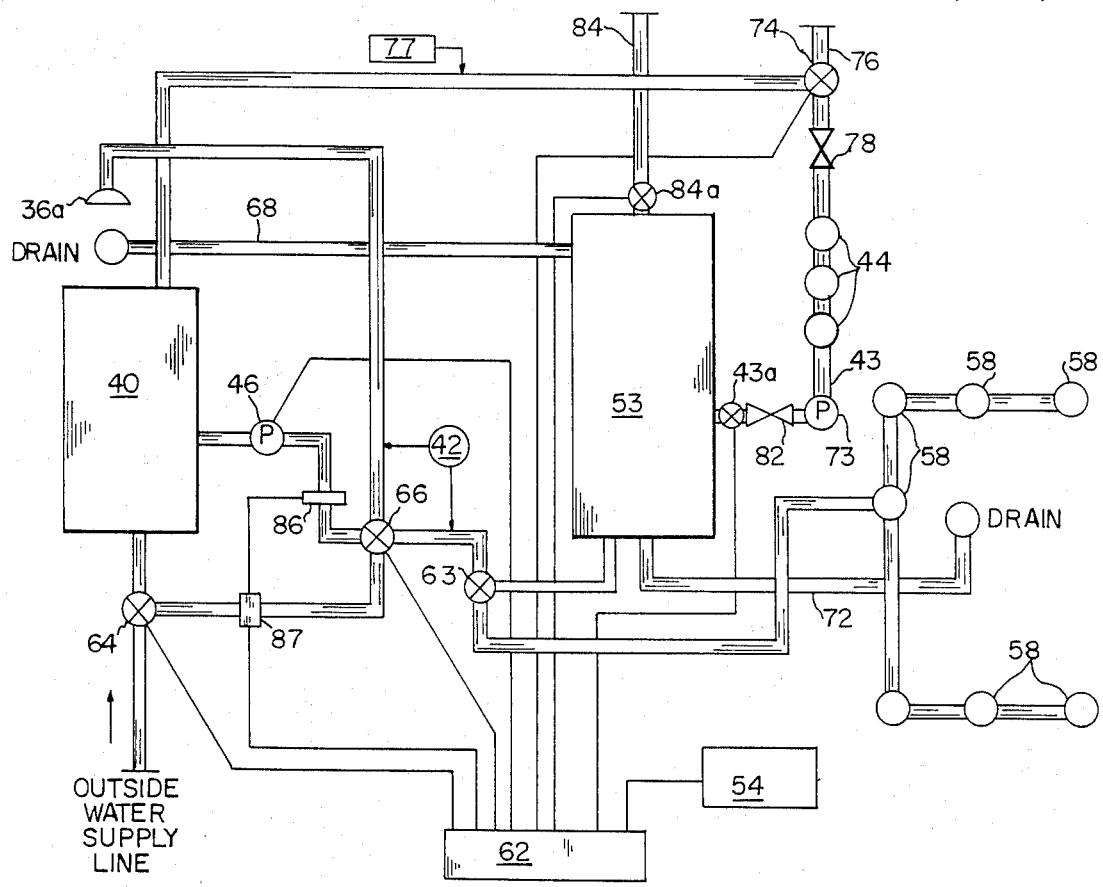
FIG. 3 is a flow diagram showing the distribution of water in the arrangement shown in FIG. 1.

Referring to FIGS. 1 and 2, there is illustrated a truck 10 carrying a body 12 for housing the arrangement and facilities comprising a preferred embodiment of this invention. It is understood that while body 12 is shown mounted on a truck chassis 13, it may instead be mounted on the bed of a trailer (not shown). In either arrangement, body 12 may be brought to the site of a chemical and/or radiation disaster at which equipment as well as persons may have been contaminated.

Body 12 may be of generally rectangular configuration, as illustrated, with a floor 14, and a roof 16. The interior of body 12 is divided into three distinct areas, namely, personnel treatment compartment 18 located at the front of the vehicle, in this case behind cab 20, a facilities compartment 22, and the clothing and equipment decontamination compartment 24 located at the rear of the vehicle. Body 12 can be extended to increase the size of any compartment or to duplicate any of the compartments, as needed or desired.

Within compartment 18 personnel who may have had their clothes and their bodies exposed to contamination are treated for the removal of such clothing and their bodies cleansed of any contaminants and dried. For this purpose there is provided an inlet door 26 for the entry of the personnel to be decontaminated and an outlet door 28 for their exit once their clothes have been changed and their bodies cleansed. Within compartment 18 is provided drums 32 and 34 to receive the contaminated clothing, a shower room or stall 36 in which the personnel are subjected to a detergent spray and a fresh water deluge from a shower head 36a. Drying of their bodies utilizing a blow dryer 37 mounted in the ceiling is carried out in room 38 where they can be suited up with fresh garments and then leave through door 28 ready to be transferred to a hospital for full decontamination and toxic screening. Tank 40 for storing clean water is located under shower room or stall 36, or may be sized to fit under the floor of the unit depending on the sizes of the equipment involved.

Within facilities compartment 22 there is provided a tank 42 for detergent solution, a filtration system 44, pump 46 located under floor 14, and a blower 48 located on ceiling 16. Doors 48 and 52 provide direct access from the outside to compartment 22. Tank 53 for receiving dirty or contaminated water is located beneath the floor of compartment 22 while auxiliary power unit 54 located at the ceiling supplies electric power to operate the apparatus requiring electricity as will be described below.

Decontamination compartment 24 located in the rear of body 12 with an access door 55 provides for the cleansing of equipment and clothing. For this purpose, compartment 24 is provided with a row of shelves 56, 29 to 36 inches high, made up of aluminum grating to permit the items placed on the shelves to be reached by sprays of detergent and water emanating from nozzles located below and above shelves 56. Nozzles 58 shown in phantom represent nozzles mounted through the floor and the ceiling directed upwardly and downwardly, respectively, to insure adequate cleansing of the clothing and equipment place on shelves 56. The items to be sprayed are placed on the shelves, and after adequate deluging, they are dried by blasting with hot air from from duct openings 59 in the walls and/or ceiling, connected to blower 37. When drying is complete, they are removed from the shelves and replaced by other items of clothing and equipment requiring decontamination. Shelves 56 are U-shaped to provide a walk in area 60 adjacent door 55.

Operation of the various facilities within body 12 is controlled at a panel 62 located on the outside of said body 12, at a vantage point where the operation of all decontamination systems can be observed. This makes it possible for the operator to be in a position to know what is going on within all compartments of body 12 while exercising control over the various systems.

For a description of the subsystem for distributing water within body 12, reference is made to FIG. 3. There is shown clean water tank 40, dirty or waste water collection tank 53, nozzles 58, filters 44, pump 46, auxiliary power unit 54, and control panel 62, all previously described. The details of the electric, control, and power systems are conventional and do not form a part of this invention.

Water from an outside supply line would be employed to fill tank 40. A multi-position valve 64, controlled from panel 62, directs water into tank 40 or directs water from the outside source to a multi-position valve 66 which is also controlled from panel 62. Pump 46, powered by auxiliary power source 54, is also under control from panel 62. In this way, when it is desired to supply fresh water from either tank 40 through pump 46 or an outside source (when available), clean water can be directed by valve 66 to either or both of shower head 36a or nozzles 58 in compartment 24. Detergent is fed into the lines to shower head 36a and nozzles 58 from tank 42. A tap off the clean water line from a valve 63 may be employed to flush out dirty water tank 53 periodically.

Contaminated water is collected in holding tank 53 from shower room or stall 36 and compartment 24 through the use of conventional drain or sewer lines 68 and 72, respectively. Chemically contaminated water in tank 53 is returned to clean water tank 40 by way of line 43 containing filters 44 to remove detergent and contaminants. A pump 73 in line 43 may be employed in the event gravity is not appropriate. A valve 74 under control from panel 62 may be actuated to permit discharge of the clean water into the environment through discharge pipe 76. Water being returned to clean water tank 40 may be chlorinated by chlorine injector 77 if desired. A pair of manually controlled test valves 78 and 82 may be employed to sample for testing the quality of the water before and after treatment in filters 44. A discharge line 84 from tank 53 would be employed where the disaster is nuclear in nature so that any radioactive water present in tank 53 can be directly transferred to a stationary or mobile tanker (not shown) located outside of truck 10. For this purpose, discharge line 84 is provided with a valve 84a which would be opened when the water is to be discharged and a valve 43a in line 43 to be closed when valve 84a is opened. Valves 84a and 43a are controlled from panel 62 as illustrated schematically.

Clean water is heated as needed by suitable heating elements 86 and 87 in clean water lines from tank 40 at the outlet from pump 46 and from valve 64 energized through and controlled from panel 62. In this way it is not necessary to heat all of the water in tank 40 thereby reducing the electrical requirements of the system.

Figure 4:
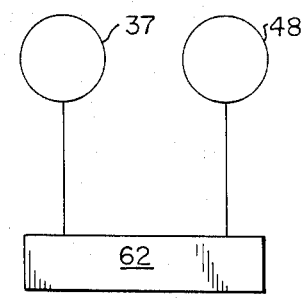
FIG. 4 is a flow diagram for the distribution of hot air for drying as used in the arrangement of FIG. 1.

As seen in FIG. 4, hot air blowers 37 and 48 are under control also from panel 62. While not shown it is understood that suitable ducting, especially in the ceilings and wall of compartment 24 to distribute the hot air in such a way as to adequately dry the person in the shower room or stall 36 and all of the equipment on the shelves in compartment 24.

In the operation of the apparatus illustrated in FIGS. 1-4, vehicle 10 would be brought to the scene of the disaster, and as fire and other emergency personnel as well as their hand carried equipment become contaminated they would come in or would be brought into body 12 for cleaning as described above. In this way, contaminated personnel can be prepared for forwarding to a hospital while hand-carried equipment can be reused thereby making it possible to use all such equipment efficiently and effectively.

Figure 5:
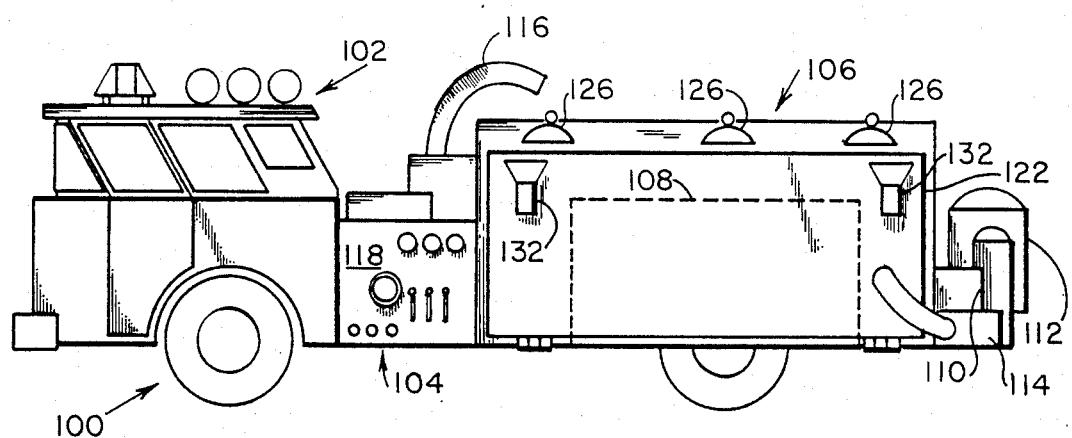
FIG. 5 is an elevation view of a vehicle incorporating an alternative embodiment of this invention.
Figure 7:
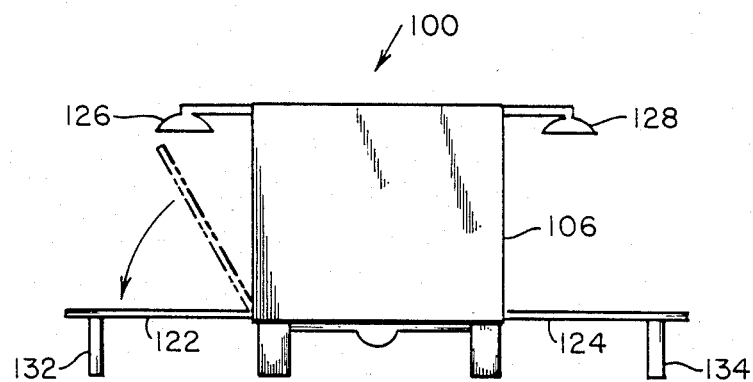
FIG. 7 is a partially schematic, rear elevation view of the vehicle shown in FIG. 6.

Under those circumstances where it is desired to increase the capability of the vehicle to handle disasters of much larger magnitude, rather than lengthen the vehicle to an impractical length, or exceed the width imposed upon vehicles by transportation authorities, a modified version of the vehicle shown in FIGS. 5 to 7 may be employed.

In this embodiment, vehicle 100 consists of a cab section 102, an intermediate section 104, and a rear section 106. Vehicle 100 contains all of the operational equipment described in connection with the embodiment shown in FIGS. 1-4, including a clean water tank 108 located within rear section 106, one or more contaminated water tanks 110, filters 112, pump 114, and a movable duct or tube 116 for carrying hot air for drying equipment. Control panel 118 is shown conveniently located on the outside of vehicle 100 along the intermediate section 104.

The principal feature of the embodiment shown in Figs. 5–7 is the arrangement wherein there is provided a pair of pivoted drain collectors 122 and 124 on opposite sides of rear section 106. A plurality of nozzles 126 on one side and 128 on the opposite side of rear section 106 along the top of rear section 106 provide the ejector and deluge sprays of water. Folding legs 132 and 134 provide support for drain collectors 122 and 124 when in the down position as shown in FIG. 7. Nozzles 126 and 128 may also be foldable flat against the sides of vehicle 100 if deemed necessary or desirable.

In the use of the arrangement shown in FIGS. 5–7, vehicle 100 would be driven to the site of the disaster and drain collectors 122 and 124 opened as shown in FIG. 7, and the shower heads 126 and 128 opened if they were folded. The man-carried equipment to be washed are then placed on collectors 122 and 124 and subject to successive sprays of detergent and water solution and then a deluge of rinse water. The waste water in collectors 122 and 124 is then pumped into waste water collection tanks 110 by way of pipes 125 and 125a. Drying of the man-carried equipment placed in collectors 122 and 124 is accomplished by pumping heated air under pressure through movable duct or tube 116 to direct the blast against the equipment on collectors 122 and 124.

One of the advantages of the embodiment shown in Figs. 5–7 is to increase the capacity of the vehicle in terms of the amount of clean water, detergent, and other equipment which can be carried to a site of a disaster without increasing its length excessively and being able to maintain the width of the vehicle within the dimensional requirements for over the road vehicles set by various local and federal transportation authorities.

It is thus seen that there has been described a mobile decontamination unit or system with complete capability of washing down and decontaminating equipment at the site of a disaster and washing down personnel. As the system fits within the confines of a vehicle capable of travelling all roads it can readily be brought in close to any such disaster where it can be held on standby and be ready for use as required. A single individual, stationed at the control panel is positioned to monitor all activities going on within the unit and to control the operations of its various components. In addition, it accomplishes all of the preceding without dumping contaminated fluids into the environment thereby worsening what presumably would be an already bad or serious situation.

While only certain preferred embodiments of this invention have been described it is understood that many variations of this invention are possible without departing from the principles of this invention as defined in the claims which follow.

What is claimed is:

1. A self-contained chemical and radiation decontamination and wash down highway transportable vehicle comprising first compartment means for receiving contaminated clothing of personnel, for showering said personnel to remove surface contaminants, and for blow drying said personnel prior to leaving said vehicle, second compartment means for containing means for detergent ejection, water deluge and drying of said personnel in said first compartment means, third compartment means for conducting chemical and radiation decontamination of equipment carried by said personnel including means for subjecting said equipment to detergent ejection, water deluge and drying, and means for filtering all waste liquids utilized in said first, second, and third compartment means for removal of all detergents and chemical contaminants and returning the cleansed waste water for storage or removal of said water, and means for bypassing said filtering means for discharging waste liquids contaminated by radiation.

2. The vehicle of claim 1 in which said third compartment means includes a shelf of grating material and nozzles both in the ceiling and the floor of said third compartment means for diverting detergent and water deluge sprays at said equipment.

3. The vehicle of claim 2 in which said vehicle includes means to recycle chemical waste water from said first and third compartment means.

4. The vehicle of claim 3 in which said vehicle includes control panel means located on the outside of said vehicle positioned to observe all of said compartment means for controlling the operation of all decontamination systems within said vehicle.

5. The vehicle of claim 4 in which said third compartment means is located at the rear of said vehicle with access through the rear of said vehicle, access to each of said first and second compartment means being from opposite sides of said vehicle.

6. The vehicle of claim 5 in which said shelf within said third compartment means is shaped in the form of a U to permit ready access to said equipment on said shelf.

7. A self-contained chemical and radiation decontamination and wash down highway transportable vehicle comprising first compartment means for receiving contaminated clothing of personnel, for showering said personnel to remove surface contaminants, and for blow drying said personnel prior to leaving said vehicle, means comprising outwardly folding drain collection means for receiving equipment to be decontaminated and water spray means mounted on the outside of said vehicle to direct sprays against said equipment, and means to collect water in said drain collection means for storage and recycling within said vehicle, said folding drain collection means comprising a pair of collectors pivoted on opposite sides and along the bottom of said vehicle normally upright and flush against the sides of said vehicle and pivoted to extend outwardly in a generally horizontal position to receive said equipment to be sprayed and for the collection of water from said spray means, said water spray means comprising a plurality of foldable water sprays to be extended outwardly when said equipment is to be sprayed, water from said spray means being directed downwardly on said equipment located on said collectors, said water spray means and said collectors being folded and pivoted against the sides of said vehicle when the latter is being moved or not in use, means comprising a movable duct for delivering air to dry said equipment on said collectors after being washed down, second compartment means to house apparatus for detergent ejection, water deluge and drying of said personnel in said first compartment means and decontamination of said equipment in said collectors, means for filtering all waste liquids utilized in said vehicle, means for bypassing said filtering means for discharging waste liquids contaminated by radiation, and control panel means located on the outside of said vehicle positioned to observe all of said compartment means for controlling the operation of all decontamination systems within said vehicle.

8. A self-contained chemical and radiation decontamination and wash down highway transportable vehicle comprising first compartment means for receiving contaminated clothing of personnel, for showering said personnel to remove surface contaminants, and for blow drying said personnel prior to leaving said vehicle, second compartment means for housing the apparatus for the detergent ejection, water deluge and drying of said personnel in said first compartment means, third compartment means for conducting chemical and radiation decontamination of equipment carried by said personnel including means for subjecting said equipment to detergent ejection, water deluge and drying, said second compartment means separating said first compartment means from said third compartment means, means for filtering all waste liquids utilized in said first and third compartment means for removal of all detergents and chemical contaminants and returning the cleansed waste water for storage or removal of said water, means for bypassing said filtering means for discharging waste liquids contaminated by radiation, said third compartment means located at the rear of said vehicle, with access through the rear of said vehicle including a shelf of grating material shaped in the form of a U open to said rear access for convenient access to said equipment on said shelf, and nozzles both in the ceiling and the floor of said third compartment means for directing detergent and water deluge sprays at said equipment.

* * * * *